Patented Dec. 19, 1939

2,183,567

UNITED STATES PATENT OFFICE 2,183,567

TREATMENT OF RUBBER

Louis H. Howland, Nutley, N. J., assignor, by mesne assignments, to United States Rubber Company, New York, N. Y., a corporation of New Jersey No Drawing. Application May 10, 1935,
Serial No. 20,830

13 Claims. (Cl. 18—50)

This invention relates to treatment of rubber and more particularly to the use in rubber of improved age resister compositions.

The action of age-resisters like the action of vulcanization accelerators has been referred to as one of catalysis. Age-resisters may be classified according to whether their primary function is one of retarding the deterioration of rubber against the effects of light, heat or air, or against deterioration due to repeated strain of the rubber as illustrated by the repeated flexing action of rubber tires on the road. Some age-resisters satisfactorily fulfill one purpose but do not satisfactorily fulfill other purposes. Just as the action of some accelerators may be improved by the action of other accelerators, which has been referred to in the literature as the dual accelerator effect, so the action of some age-resisters may be improved by the action of other age-resisters to give an anti-aging value which is more than the additive effect of the two substances.

An object of this invention is to provide a composition having superior properties for retarding the deterioration of rubber. A further object is to provide an improved anti-flexcracking agent and particularly one which satisfactorily fulfills the requirement for preventing the failure due to rapidly repeated strain of rubber, particularly rubber containing more than 30 parts of carbon black per 100 parts of rubber, e. g., tire tread stocks.

It has been found that if the product of condensation of an aliphatic ketone and an arylamine is used as one component of the composition and an N,N'-disubstituted phenylene diamine or quinonoid oxidation product thereof which contains a substituted diamino-benzene nucleus, is used as another component of the composition, the composition is far more active than either component and beyond the mere additive effect of the proportions of materials used, that is, the age-resisting characteristics of either of such components are markedly intensified in an unexpected manner by admixture of said components.

For the purposes of illustrating the best modes of the invention the acetone-diphenylamine reaction product, which may be produced according to a procedure as set forth in U. S. P. No. 1,975,167, is selected for specifically showing the activating influence of N,N'-substituted diaminobenzene compounds.

Example 1.—A tire tread composition containing by weight, 100 parts of smoked sheet rubber, 45 parts of carbon black, 10 parts of zinc oxide, 3.5 parts of pine tar, 1.25 parts of stearic acid, 3.25 parts of sulphur, 1.25 parts of hexamethylene tetramine and 0.35 part of diphenyl guanidine was divided into 4 parts A, B, C, and D. A is used as a control; B has added to it 1 part of acetone-diphenylamine reaction product per 100 parts of rubber; C has added to it 1 part per 100 parts of rubber of a mixture of 0.65 part of acetone-diphenylamine reaction product with 0.35 part of N,N'-diphenyl para-phenylenediamine and D has added to it 1 part of N,N'-diphenyl p-phenylenediamine.

These mixes were cured in a mold for 75 minutes at 45 pounds per sq. in. steam pressure, after which they were given a 90° bending test. In this test, slabs having a half round groove were repeatedly bent from 0-90° and return. The results are in terms of kilocycles of bendings required for half-life; that is, the test is continued until the load required to bend the sample to a 90° angle has been reduced to 50% of the initial bending load. The final comparative values are as follows:

A _____ 235
B _____ 438
C _____ 459
D _____ 442

Example 2.—Quinone dianil (p-benzoquinonedianil) having the formula

which is an oxidation product of N,N'-diphenyl p-phenylene-diamine, is also an activator for the ketone-amines. A typical tire tread composition containing by weight smoked sheet rubber 100 parts, carbon black 42 parts, zinc oxide 10 parts, pine tar 3.5 parts, stearic acid 4 parts, sulfur 3.25 parts, mercaptobenzothiazole 1 part, was divided into 4 portions A, B, C and D. Stock A is the control. Age-resister compositions were added to the other stocks. The stocks are identified as to the kind and amount of age-resister added per 100 parts of rubber, as follows:

Stock A— No age-resister;
Stock B— Acetone-diphenylamine reaction product 2 parts;
Stock C— { Acetone-diphenylamine reaction product 1 part plus
Quinone-dianil 1 part;
Stock D— Quinone-dianil 2 parts.

The mixes were cured for 45, 60 and 75 minutes at 30 pounds per sq. in. steam pressure and were then subjected to the 90° bending tests with the following comparative results:

*Kilocycles of bendings for half-life*

| Time of cure | A | B | C | D |
|---|---|---|---|---|
| 45' | 220 | 377 | 467 | 320 |
| 60' | 312 | 331 | 366 | 312 |
| 75' | 263 | 259 | 459 | 318 |
| Average | 265 | 322 | 431 | 317 |

The effectiveness of the compositions in retarding deterioration of rubber subjected to ageing is illustrated by the following example:

*Example 3.*—A typical inner tube composition was divided into four portions A, B, C, and D. A is the control. The kind and amount of age-resister added to the mixes per 100 parts by weight of rubber was as follows:

Stock A—No age-resister;
Stock B—Acetone-diphenylamine reaction product 1 part;
Stock C—Acetone-diphenylamine reaction product 0.5 part plus 0.5 part of p-(p-toluene sulfonylamino)-phenyl tolyl amine;
Stock D—1 part of p-(p-toluene sulfonylamino)-phenyl tolyl amine.

The type of disubstituted phenylene diamine used in this example, as well as other types usable herein, is shown by my patent U. S. P. 1,907,545.

The various mixes were cured for 6, 8 and 10 minutes at 60 pounds per sq. in. steam pressure and thereafter were subjected to 216 hours ageing in the oxygen bomb at 70° C. and 300 pounds per sq. in. pressure. Results were as follows:

*Unaged*

| Time of cure | A | | B | | C | | D | |
|---|---|---|---|---|---|---|---|---|
| | T | E | T | E | T | E | T | E |
| 6' | 4,455 | 780 | 4,399 | 770 | 4,470 | 790 | 4,291 | 750 |
| 8' | 4,225 | 760 | 4,322 | 760 | 4,386 | 760 | 4,172 | 750 |
| 10' | 4,054 | 740 | 3,510 | 710 | 4,086 | 750 | 4,052 | 730 |

*Aged*

| Time of cure | A | | B | | C | | D | |
|---|---|---|---|---|---|---|---|---|
| | T | E | T | E | T | E | T | E |
| 6' | Melted | Melted | 3,205 | 690 | 3,510 | 690 | 3,146 | 720 |
| 8' | Melted | Melted | 2,619 | 650 | 3,319 | 680 | 2,951 | 680 |
| 10' | 1,129 | 540 | 2,566 | 630 | 3,253 | 660 | 2,706 | 760 |

T is tensile in pounds per square inch at break.
E is percent elongation at break.

It will be apparent from the foregoing examples that the age-resisting characteristics of the product of condensation of an aliphatic ketone with an arylamine is markedly intensified by the substitution for a portion of said product, of an N, N'-disubstituted phenylene diamine or quinonoid oxidation product thereof.

Other aliphatic ketone-arylamines may be used, more especially the multi-component product of reaction of an aliphatic ketone and a simple primary or secondary or primary-secondary aromatic amine, among the best known being the products of reaction resulting from condensing equimolecular or other proportions of either acetone, diacetone alcohol, mesityl oxide, phorone or ethyl methyl ketone with aniline, toluidine, naphthylamine or a diarylamine such as diphenylamine, phenyl-alpha-naphthylamine, phenyl-beta-naphthylamine, phenyl tolylamine, ditolylamine, dinaphthylamine, tolyl naphthyl-amine, or p-amino diphenylamine, preferably in the presence of a reaction catalyst and either under refluxing conditions or at elevated temperatures in an autoclave, according to the already known practice in this art. The product of reaction of the ketone and the amine may be used as prepared or it may be freed of unreacted materials and/or it may be treated with an alkali to remove acidity and improve its anti-ageing properties. Further, aldehyde and sulphur reaction products of such ketone-amine reaction products are to be included within the broad scope of invention as claimed or as equivalents thereof in the mix with the disubstituted diamino-benzene compounds.

Examples of other N, N'-disubstituted phenylene diamine compounds that may be used in the composition are phenyl tolyl p-phenylene diamine, tolyl naphthyl p-phenylene diamine, naphthyl phenyl p-phenylenediamine, naphthyl tolyl p-phenylenediamine, dinaphthyl-p-phenylene diamine, naphthyl benzyl p-phenylene diamine, dibenzyl p-phenylene diamine, N-(p-tolyl)-N'-(p-toluene-sulphonyl)-p-phenylene diamine, N-phenyl-N'-acetyl-p-phenylene diamine.

More than one of the complex ketone-amine products variously referred to above may be used in the mix together with either one or more than one of the substituted phenylene diamines.

The components of the composition may be added to the rubber separately, but are preferably intimately mixed by fusion or blending before they are incorporated with the rubber.

The components may be used in various ratios other than those shown in the examples. Particularly good results are shown to be attainable when the amount of the complex ketone-amine reaction product is at least equal to the amount of substituted phenylene diamine.

The term rubber in the claims is to be construed broadly as including caoutchouc, balata, gutta percha, synthetic rubber, rubber isomers in solid or liquid form including latex or artificial dispersions of the materials.

The age-resister composition may be incorporated into the rubber by milling or similar process, or by mixing with the rubber latex before coagulation, or the application thereof may be made to the surface of the crude or vulcanized rubber.

Goods of various description may have their useful life prolonged by the practice of this invention, including tubes, hose, belting, packing, boots and shoes, surgical rubber goods, dipped rubber articles, etc. The invention, however, is particularly useful in connection with goods which like vehicle tires are subject to deterioration under the combined agencies of light, heat, air and repeated flexing strains.

Having thus described my invention what I claim and desire to protect by Letters Patent is:

1. A process of preserving rubber which comprises treating the rubber with an age-resister comprising a preponderant proportion of the composite reaction product of an aliphatic ketone and an arylamine, and in addition thereto an activating amount of an N,N'-diaryl phenylene diamine.

2. A process of preserving rubber which comprises treating the rubber with an age-resister comprising a preponderant proportion of the composite reaction product of acetone and arylamine, and in addition thereto an activating amount of an N,N'-diaryl p-phenylene diamine.

3. A process of preserving rubber which comprises treating the rubber with an age-resister comprising a preponderant proportion of the composite reaction product of acetone and a diarylamine, and in addition thereto an activating amount of N,N'-diphenyl p-phenylene diamine.

4. A process of preserving rubber which comprises treating the rubber with an age-resister comprising a preponderant proportion of the composite reaction product of acetone and diphenylamine, and in addition thereto an activating amount of N,N'-diphenyl p-phenylene diamine.

5. A vulcanized rubber product having improved resistance to repeated flexing strains which is the vulcanization product of a rubber composition comprising an age-resister containing a preponderant proportion of the composite reaction product of acetone and an arylamine, and in addition thereto an activating amount of an N,N'-diaryl p-phenylene diamine.

6. A vulcanized rubber product having improved resistance to repeated flexing strains comprising the vulcanization product of a rubber composition containing an age-resister comprising a preponderant proportion of the composite reaction product of acetone and diphenylamine, and in addition thereto an activating amount of an N,N'-diaryl p-phenylene diamine.

7. A vulcanized rubber product having improved resistance to repeated flexing strains comprising the vulcanization product of a rubber composition containing an age-resister comprising a preponderant proportion of the composite reaction product of acetone and diphenylamine, and in addition thereto an activating amount of N,N'-diphenyl p-phenylene diamine.

8. An age-resister composition comprising an admixture of a preponderant proportion of the composite reaction product of acetone and diphenylamine, and in addition thereto an activating amount of N,N'-diphenyl p-phenylene diamine.

9. An age-resister composition comprising an admixture of a substantial proportion of an aliphatic ketone-arylamine condensation product and an activating amount of a benzoquinone dianil not exceeding the amount of the ketone-amine.

10. An age-resister composition comprising an admixture of a substantial proportion of an aliphatic ketone-arylamine condensation product and an activating amount of an N-(aryl)-N'-(arylsulphonyl)-p-phenylene diamine.

11. A process of preserving rubber which comprises incorporating therein an age-resister comprising a preponderant proportion of the product of reaction of an aliphatic ketone with an arylamine and in addition thereto an activating amount of an aromate diamino compound selected from the class consisting of N,N'-di-aryl-p-phenylene diamines and quinonoid di-imine oxidation products thereof, and N-aryl-N'-acidyl-p-phenylene diamines.

12. An age-resister composition comprising a preponderant proportion of the composite reaction product of an aliphatic ketone and an arylamine, and in addition thereto an activating amount of an aromatic diamino compound selected from the class consisting of N,N'-diaryl p-phenylene diamines and quinonoid di-imine oxidation products thereof, and N-aryl-N'-acidyl-p-phenylene diamines.

13. A method of preserving rubber which comprises treating rubber with an aliphatic ketone-arylamine reaction product, and in addition thereto a diaryl phenylene diamine as an activator for said reaction product.

LOUIS H. HOWLAND.